(12) United States Patent
Watanabe et al.

(10) Patent No.: US 10,338,582 B2
(45) Date of Patent: Jul. 2, 2019

(54) VEHICULAR AWAKENING SYSTEM

(71) Applicant: TOYOTA JIDOSHA KABUSHIKI KAISHA, Toyota-shi, Aichi-ken (JP)

(72) Inventors: Masaya Watanabe, Miyoshi (JP); Satoshi Arikura, Niwa-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/715,871

(22) Filed: Sep. 26, 2017

(65) Prior Publication Data

US 2018/0088573 A1 Mar. 29, 2018

(30) Foreign Application Priority Data

Sep. 29, 2016 (JP) ................................. 2016-191818

(51) Int. Cl.
| | | |
|---|---|---|
| *B60K 28/02* | (2006.01) | |
| *G05D 1/00* | (2006.01) | |
| *B60W 50/16* | (2012.01) | |
| *G08B 21/06* | (2006.01) | |
| *G08B 6/00* | (2006.01) | |

(52) U.S. Cl.
CPC ............ *G05D 1/0061* (2013.01); *B60W 50/16* (2013.01); *G08B 6/00* (2013.01); *G08B 21/06* (2013.01); *G05D 2201/0213* (2013.01)

(58) Field of Classification Search
CPC .................... A47C 7/467; A47C 7/029; B60R 2021/23308; B60R 2021/2612; B60R 21/18; B60R 21/268; B60R 22/12; B60R 22/26; B60R 2021/0004; B60R 2021/0006; B60R 21/0132; B60R 21/01532; B60R 21/017; Y10S 297/03; A61H 2201/0138; A61H 2201/0149; B60N 2/914; B60W 50/16; G05D 1/0061; G05D 2201/0213; G08B 21/06; G08B 6/00
USPC ....... 340/575, 902, 901, 903, 906, 988, 989, 340/436, 691.1, 691.3, 691.5, 435, 467, 340/447, 457.4, 576
See application file for complete search history.

(56) References Cited

U.S. PATENT DOCUMENTS

| | | | | |
|---|---|---|---|---|
| 6,630,891 B1* | 10/2003 | Dilling | ................ | G08G 1/0965 340/901 |
| 2005/0052081 A1* | 3/2005 | Sayama | .................... | H02J 1/14 307/10.1 |
| 2007/0241914 A1* | 10/2007 | Ihara | ...................... | G08B 21/06 340/575 |
| 2011/0006507 A1* | 1/2011 | Fukawatase | ............ | B60R 21/18 280/733 |

(Continued)

FOREIGN PATENT DOCUMENTS

| | | |
|---|---|---|
| JP | 2009-125276 A | 6/2009 |
| JP | 2014-083916 A | 5/2014 |
| JP | 2014-106854 A | 6/2014 |

*Primary Examiner* — Daniel Previl
(74) *Attorney, Agent, or Firm* — Oliff PLC

(57) ABSTRACT

A vehicular awakening system having a drive control section capable of switching a drive state of a vehicle between automatic drive and manual drive; a pressing section capable of pressing a standard position between shoulder blades of a driver; and a pressing control section that activates the pressing section when the drive state of the vehicle is automatic drive or when said drive state of the vehicle is switched from automatic drive to manual drive by the drive control section.

8 Claims, 9 Drawing Sheets

(56) References Cited

U.S. PATENT DOCUMENTS

| | | | | |
|---|---|---|---|---|
| 2013/0002415 A1* | 1/2013 | Walli | ............... | B60L 1/00 340/438 |
| 2014/0191550 A1* | 7/2014 | Katoh | ............... | B60N 2/80 297/337 |
| 2016/0059853 A1* | 3/2016 | Yamakoshi | ............ | G05B 15/02 701/36 |
| 2017/0110022 A1* | 4/2017 | Gulash | ............ | G09B 9/052 |

* cited by examiner

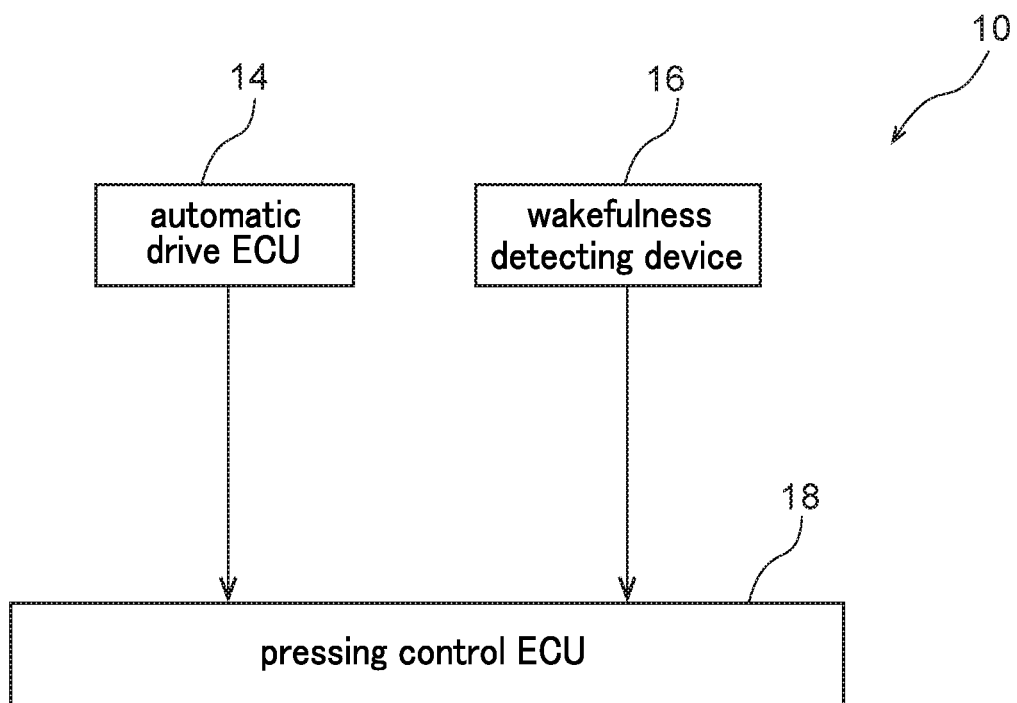

VEHICULAR AWAKENING SYSTEM

CROSS-REFERENCE TO RELATED APPLICATION

This application is based on and claims priority under 35 USC 119 from Japanese Patent Application No. 2016-191818 filed on Sep. 29, 2016, the disclosure of which is incorporated by reference herein.

BACKGROUND

Technical Field

The present invention relates to a vehicular awakening system.

Related Art

Japanese Patent Application Laid-Open Publication No. 2014-106854 discloses an invention relating to an automatic drive vehicle control device.

This automatic drive vehicle control device is configured such that when it has been judged that conditions for performing automatic drive are not being satisfied during automatic drive, a notification urging cancellation of automatic drive is made to a driver.

However, in a case according to the prior art described in Japanese Patent Application Laid-Open Publication No. 2014-106854, it is configured such that when, regardless of a notification urging cancellation of automatic drive having been made to the driver, manual drive has not been switched to due to a wakefulness level of the driver being low, a vehicle is guided to a safe place by control. In other words, the prior art described in Japanese Patent Application Laid-Open Publication No. 2014-106854 has room for improvement from the viewpoint of securing a state that the driver is able to return to manual drive when a switch from automatic drive to manual drive is made.

SUMMARY

The present invention takes account of the above-described facts, and has an object of obtaining a vehicular awakening system that can secure a state that a driver is able to return to manual drive when a switch from automatic drive to manual drive is made.

A vehicular awakening system according to a first aspect of the present invention includes: a drive control section capable of switching a drive state of a vehicle between automatic drive and manual drive; a pressing section capable of pressing a standard position between shoulder blades of a driver; and a pressing control section that activates the pressing section when the drive state of the vehicle is automatic drive or when said drive state of the vehicle is switched from automatic drive to manual drive by the drive control section.

Due to the first aspect of the present invention, a drive control section is included, and it is configured possible for a drive state of a vehicle to be switched between automatic drive and manual drive by said drive control section.

Incidentally, when the drive state of the vehicle is set to automatic drive, the driver does not need to drive the vehicle, hence, conceivably, their judgment, and so on, with respect to a periphery of the vehicle deteriorates, and even if the drive state of the vehicle is switched to manual drive, it becomes difficult for the driver to immediately return to driving of the vehicle.

Now, in the present invention, a pressing section capable of pressing a standard position between shoulder blades of the driver, and a pressing control section that actuates said pressing section, are included. The standard position mentioned here means a periphery of a fifth thoracic vertebra of a standard Japanese male. Moreover, when the drive state of the vehicle is automatic drive or when said drive state of the vehicle is switched from automatic drive to manual drive by the drive control section, the pressing section is actuated by the pressing control section, whereby the standard position of the driver is pressed by said pressing section. As a result, back muscles of the driver are stretched by the pressing section, whereby a wakefulness level of the driver is increased, and maintenance of a state where driving of the vehicle by said driver is possible or return to a state where driving of the vehicle by said driver is possible, are enabled.

In a vehicular awakening system according to a second aspect of the present invention, the pressing section is configured including: an air bag that is arranged on an inside of a seat back in a seat in which the driver sits, and that is capable of expanding by being supplied with air to press the standard position; and an air supply section capable of pressure-feeding air to said air bag based on control by the pressing control section.

Due to the second aspect of the present invention, an air bag that expands by being supplied with air and is capable of pressing the standard position of the driver is arranged on an inside of a seat back in a seat in which said driver sits. Moreover, air is pressure-fed to this air bag from an air supply section based on control by the pressing control section, whereby said air bag expands and the standard position of the driver is pressed. As a result, in the present invention, an increase in the number of components arranged in the seat back can be suppressed more compared to in a configuration where the standard position of the driver is pressed by a member such as a roller.

In a vehicular awakening system according to a third aspect of the present invention, the air bag is formed in a rectangular shape that covers the standard position when viewed from a front of the seat and extends in a seat up-down direction.

Due to the third aspect of the present invention, the air bag that presses the standard position of the driver is formed in a rectangular shape that covers said standard position when viewed from a front of the seat and extends in a seat up-down direction. As a result, the standard position of the driver can be pressed, even if there is variation in body build or seating position of said driver.

In a vehicular awakening system according to a fourth aspect of the present invention, the pressing control section includes a driver state detecting section capable of detecting a wakefulness level of the driver, and the pressing section is configured so as to be capable of pressing the standard position when the drive state of the vehicle is automatic drive and the wakefulness level of the driver detected by the driver state detecting section is lower than a certain value.

Due to the fourth aspect of the present invention, a driver state detecting section is provided in the pressing control section, and is configured capable of detecting a wakefulness level of the driver. Moreover, the pressing section is configured capable of pressing the standard position when the drive state of the vehicle is automatic drive and the wakefulness level of the driver detected by the driver state detecting section is lower than a certain value. As a result, although the pressing section does not actuate when the drive state of the vehicle is automatic drive and the wakefulness level of the driver is higher than the certain value, the standard position of the driver is pressed by the pressing section when the drive state of the vehicle is automatic drive and the wakefulness level of the driver is lower than the certain value.

In a vehicular awakening system according to a fifth aspect of the present invention, the pressing control section further includes an angle detecting section capable of detecting a tilting angle of the seat back in the seat in which the driver sits, and the driver state detecting section is configured so as to be capable of detecting the wakefulness level of the driver when it has been detected by the angle detecting section that the seat back is tilted to a seat rear side from a reference position.

Due to the fifth aspect of the present invention, an angle detecting section is provided in the pressing control section, and is configured capable of detecting a tilting angle of the seat back in the seat in which the driver sits.

Incidentally, when the tilting angle of the seat back is comparatively small, for example, when the seat back is in the reference position during manual drive, and so on, it is difficult for own weight of the driver to be applied to the seat back, hence, conceivably, a proportion of pressing force due to the pressing section employed in pressing of the standard position is reduced.

Now, in the present invention, the wakefulness level of the driver is configured capable of being detected by the driver state detecting section when it has been detected by the angle detecting section that the seat back is tilted to a seat rear side from a reference position. In other words, in the present invention, when the seat back is tilted to the seat rear side from the reference position, the wakefulness level of the driver is detected by the driver state detecting section. Moreover, the standard position is pressed by the pressing section when the drive state of the vehicle is automatic drive and the wakefulness level of the driver detected by the driver state detecting section is lower than the certain value. As a result, in the present invention, it is configured such that when the seat back is in the reference position, the pressing section does not actuate. On the other hand, when the seat back is tilted to the seat rear side from the reference position, that is, when it is easy for own weight of the driver to be applied to the seat back, the standard position is pressed by the pressing section when the drive state of the vehicle is automatic drive and the wakefulness level of the driver is lower than the certain value.

In a vehicular awakening system according to a sixth aspect of the present invention, the pressing control section includes a notifying section capable of notifying the driver of the fact that the drive state of the vehicle will be switched from automatic drive to manual drive by the drive control section, and the pressing section is configured so as to be capable of pressing the standard position during a period from notification of the driver by the notifying section until the drive state of the vehicle is switched from automatic drive to manual drive.

Due to the sixth aspect of the present invention, a notifying section is provided in the pressing control section, and the driver is notified, by said notifying section, of the fact that the drive state of the vehicle will be switched from automatic drive to manual drive by the drive control section. Moreover, the standard position is pressed by the pressing section in a period from notification of the driver by the notifying section to the drive state of the vehicle being switched from automatic drive to manual drive. As a result, at such times as when continuation of automatic drive of the vehicle is difficult, the driver is notified of switching from automatic drive to manual drive, and regardless of the wakefulness level of said driver, back muscles of said driver are stretched by the pressing section, whereby the wakefulness level of said driver is increased.

As described above, the vehicular awakening system according to the first aspect of the present invention has an excellent effect of being able to secure a state that the driver is able to return to manual drive when a switch from automatic drive to manual drive is made.

The vehicular awakening system according to the second aspect of the present invention has an excellent effect of making it possible to press the standard position of the driver, without greatly changing a configuration of the seat back.

The vehicular awakening system according to the third aspect of the present invention has an excellent effect that the wakefulness level of the driver can be increased, even if there is variation in body build or seating position of the driver.

The vehicular awakening system according to the fourth aspect of the present invention has an excellent effect that the wakefulness level of a driver of low wakefulness level can be efficiently increased.

The vehicular awakening system according to the fifth aspect of the present invention has an excellent effect that the proportion of pressing force due to the pressing section employed in pressing of the standard position can be increased.

The vehicular awakening system according to the sixth aspect of the present invention has an excellent effect that return to manual drive of the driver can be smoothly made after notification of switching from automatic drive to manual drive.

BRIEF DESCRIPTION OF THE DRAWINGS

Exemplary embodiments of the present invention will be described in detail based on the following figures, wherein:

FIG. 2 is a block diagram showing a schematic configuration of the vehicular awakening system according to the first embodiment.

DETAILED DESCRIPTION OF THE INVENTION

<First Embodiment>

Figure 1:
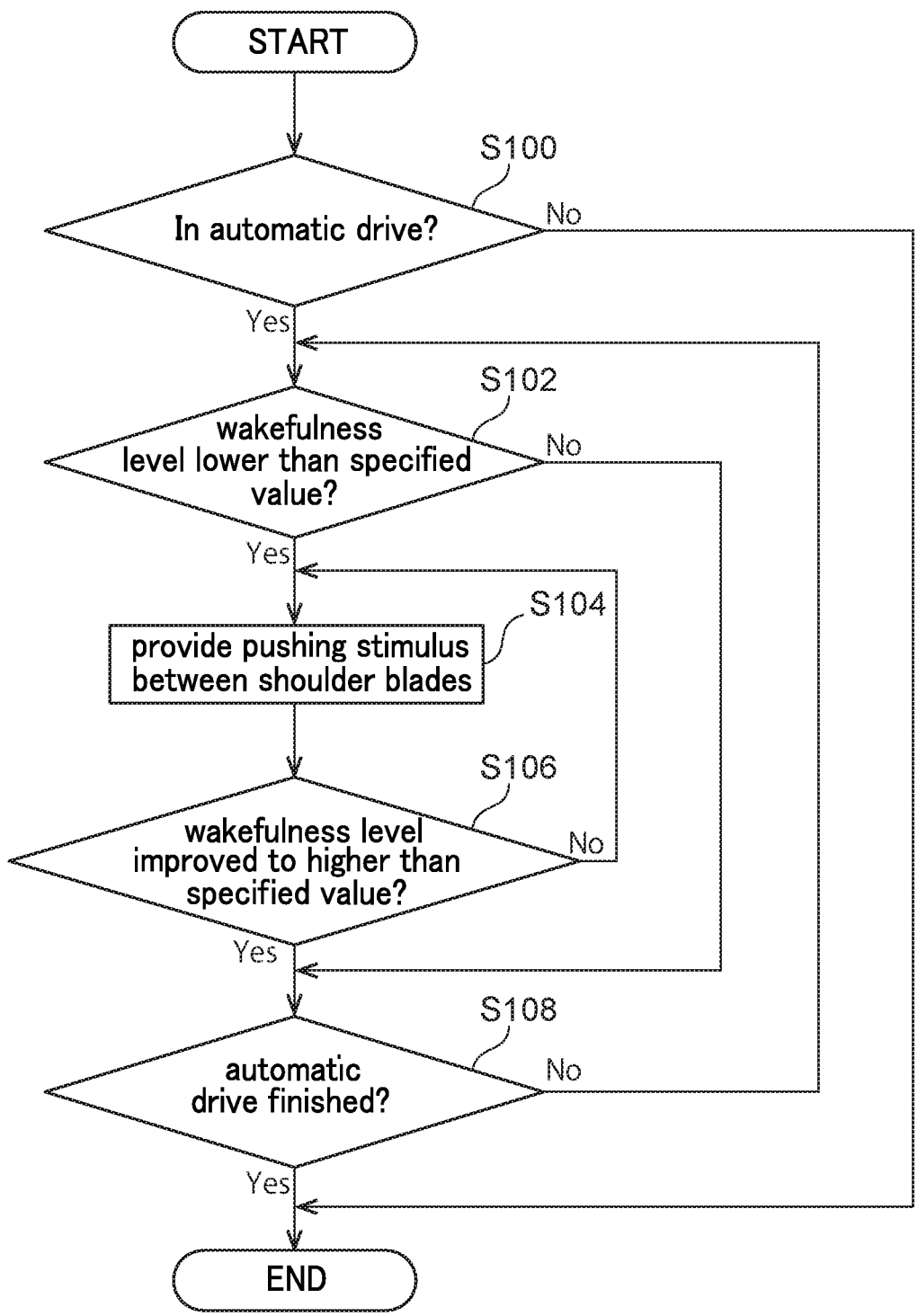
FIG. 1 is a flowchart showing a process performed by a vehicular awakening system according to a first embodiment.

A first embodiment of a vehicular awakening system according to the present invention will be described below using FIGS. 1 to 5. As shown in FIGS. 2 and 5, a "vehicular awakening system 10" in the present embodiment is configured including: a "pressing device 12" acting as a pressing section; an "automatic drive ECU 14" acting as a drive control section; a "wakefulness detecting device 16" acting as a driver state detecting section; and a "pressing control ECU 18" acting as part of a pressing control section. The pressing device 12 is provided in a "vehicular seat 22" (hereafter, referred to as seat 22) in which a driver 20 sits, and the automatic drive ECU 14, the wakefulness detecting device 16, and the pressing control ECU 18 are each provided on a vehicle body side. Note that an arrow FR, an arrow UP, and an arrow RH appropriately shown in each of the drawings indicate, respectively, a frontward direction, an upward direction, and a rightward direction of the seat 22. Moreover, in the present embodiment, the frontward direction, the upward direction, and the rightward direction of the seat 22 correspond to a frontward direction, an upward direction, and a rightward direction of a vehicle in which this seat 22 is mounted.

First, a configuration of the seat 22 provided with the pressing device 12, will be described. As shown in FIG. 5, a seat main body 24 is configured including: a seat cushion 26 that supports buttocks and thighs of the driver 20; a "seat back 28" that supports a back of the driver 20; and a headrest 30 that supports a head of the driver 20. Moreover, the headrest 30 is supported movably up-and-down in an end section on a seat upper side of the seat back 28, and the seat back 28 is supported tiltably in an end section on a seat rear side of the seat cushion 26.

Note that in the present embodiment, the driver 20 is assumed to be a standard Japanese male having a height of about 170[cm], and an outline of the driver 20 shown in each of the drawings can also be regarded as an outline of a dummy (JM50) of a standard Japanese male in a state of being seated in a certain seating posture in the seat 22. Moreover, although mentioned later in detail, the pressing device 12 is configured including: an "air bag 32"; an electromagnetic valve 34; and a "pump 36" acting as an air supply section, the air bag 32 is arranged on an inside of the seat back 28, and the electromagnetic valve 34 and pump 36 are arranged in an unillustrated seat frame. Moreover, the electromagnetic valve 34 and the pump 36 are electrically connected to the pressing control ECU 18, and control of the pressing device 12 is configured to be performed by said pressing control ECU 18. Moreover, as shown in FIG. 2, the automatic drive ECU 14 and the wakefulness detecting device 16 are electrically connected to the pressing control ECU 18.

The automatic drive ECU 14 is configured capable of switching a drive state of the vehicle between manual drive and automatic drive, and performs various kinds of control on the vehicle during automatic drive. In detail, various kinds of sensors disposed in the vehicle are electrically connected to the automatic drive ECU 14, and the automatic drive ECU 14 controls driving of the vehicle by controlling an accelerator amount, a brake amount, a steering angle, and so on, based on peripheral circumstances of the vehicle obtained from these sensors. Note that the vehicle is provided with an unillustrated input section electrically connected to the automatic drive ECU 14, and by various kinds of signals being inputted to the automatic drive ECU 14 from said input section, it is configured possible for start or finish of automatic drive to be controlled. Moreover, as shown in FIG. 2, the automatic drive ECU 14 is electrically connected to the pressing control ECU 18, and a signal indicating whether the vehicle is in automatic drive or is in manual drive is configured to be outputted to the pressing control ECU 18 from the automatic drive ECU 14.

On the other hand, the wakefulness detecting device 16 is configured including: an unillustrated CCD camera (imaging section); and an unillustrated degree-of-opening detecting section electrically connected to said CCD camera. As an example, the CCD camera is integrally incorporated in an inner mirror for rear visual recognition provided on an unillustrated roof of the vehicle, and is configured to image the seat 22 (driving seat) from obliquely above said seat 22. Moreover, an angle of view of the CCD camera is determined such that at least a face (or a part thereof) of the driver 20 including one eye of the driver 20 falls in an imaging range.

The degree-of-opening detecting section is configured to find a degree-of-opening of an eye of the driver 20 from an image of the driver 20 obtained by the CCD camera, and is configured able to determine whether the eye of the driver 20 is closed or not, by comparing said degree-of-opening and a threshold value stored in the degree-of-opening detecting section. Moreover, in the degree-of-opening detecting section, a time that the degree-of-opening of the eye of the driver 20 is smaller than the threshold value, that is, a closed eye time when the driver 20 is closing their eye, is configured measurable. Furthermore, the degree-of-opening detecting section is configured to determine that the driver 20 has blinked when the closed eye time is shorter than a certain time. On the other hand, it is configured that when the closed eye time is longer than a certain time, the driver 20 is determined, by the degree-of-opening detecting section, to be in a consciousness lowered state, that is, a state where the wakefulness level of the driver 20 is lower than a certain value (specified value) enabling execution of manual drive. Moreover, it is configured such that when the wakefulness level of the driver 20 is lower than the above-described certain wakefulness level, a signal is outputted from the degree-of-opening detecting section to the pressing control ECU 18.

Now, in the present embodiment, there are features in configurations of the pressing control ECU 18 and the pressing device 12, particularly a configuration of the air bag 32 provided in the pressing device 12. It is decided to describe these configuring elements that configure a main section of the present embodiment, in detail, below.

It is decided to first describe a basic configuration of the pressing device 12, using FIG. 5. As mentioned above, the pressing device 12 is configured including the air bag 32, the electromagnetic valve 34, and the pump 36, and is configured such that air supplied from the pump 36 is supplied to the air bag 32 via the electromagnetic valve 34. Note that the electromagnetic valve 34 and the pump 36 are configured to actuate by electric power supplied, via the likes of an unillustrated relay, from an unillustrated power supply mounted in the vehicle.

In detail, the electromagnetic valve 34 is configured as a three-way valve and includes a common port, an intake port, and an exhaust port that are each unillustrated, one end side of a common tube 38 is connected to the common port, and one end side of an intake tube 40 is connected to the intake port. In addition, another end side of the common tube 38 is connected to the air bag 32, and another end side of the intake tube 40 is connected to the pump 36. Note that the exhaust port of the electromagnetic valve 34 is connected to an unillustrated exhaust vent via an unillustrated exhaust tube.

Moreover, it is configured such that opening/closing of the common port, the intake port, and the exhaust port of the electromagnetic valve 34 and actuation of the pump 36 are controlled by the pressing control ECU 18, whereby supply to the air bag 32 and discharge from the air bag 32 are performed. Specifically, when the common port and the intake port of the electromagnetic valve 34 are opened and the exhaust port of the electromagnetic valve 34 is closed by control of the pressing control ECU 18, a supply state in which the common tube 38 and the intake tube 40 are communicated, is attained. It is configured such that at this time, supply of air from the pump 36 to inside the air bag 32 is enabled and the air bag 32 expands. On the other hand, when the common port and the exhaust port of the electromagnetic valve 34 are opened and the intake port of the electromagnetic valve 34 is closed by control of the pressing control ECU 18, an exhaust state in which the common tube 38 and the exhaust tube are communicated, is attained. It is configured such that at this time, air is discharged from the exhaust vent from inside the air bag 32 via the electromagnetic valve 34 and the exhaust tube, whereby the air bag 32 contracts.

Moreover, the pressing control ECU 18 controls the pressing device 12 based on a signal inputted from the automatic drive ECU 14 indicating whether the vehicle is in automatic drive or is in manual drive and a signal inputted from the wakefulness detecting device 16 when the wakefulness level of the driver 20 is lower than a certain wakefulness level. Specifically, the pressing control ECU 18 actuates the pressing device 12 such that expansion and contraction of the air bag 32 are repeated, only when a signal indicating being in automatic drive has been inputted from the automatic drive ECU 14 and a signal has been inputted from the wakefulness detecting device 16. In other words, the wakefulness detecting device 16 is employed in control of actuation of the pressing device 12, and in the present embodiment, the pressing control ECU 18 and the wakefulness detecting device 16 function as the pressing control section.

Next, the configuration of the air bag 32 will be described using FIGS. 3 and 4. As shown in FIGS. 3B and 4B, the air bag 32, in a contracted state, is overall configured in a rectangular plate shape extending in the seat up-down direction when viewed from a front of the seat 22, and is configured by an expandable/contractable material such as a resin material of the likes of polyurethane or a rubber material. Note that the air bag 32 is formed so as to be airtight.

In more detail, a first expanding section 32A, a second expanding section 32B, and a third expanding section 32C of the air bag 32 are configured disposed so as to be overlaid in this order from a seat front side, and have outer peripheral shapes when viewed from the front of the seat 22 that become larger in this order. Specifically, a dimension A in a longitudinal direction (a dimension in the seat up-down direction) of the third expanding section 32C disposed most to a seat rear side is set to 200 [mm], and a dimension B in a transverse direction (a dimension in the seat width direction) of the third expanding section 32C is set to 100 [mm]. Moreover, a distance d between outer peripheral sections of expanding sections adjacent to each other, is set to 10 [mm]. Furthermore, a base section 32C1 configuring a portion on the seat rear side in the third expanding section 32C is formed in a plate shape thicker than a portion other than the base section 32C1 in the air bag 32, and is configured to expand/contract with more difficulty than the portion other than the base section 32C1.

Moreover, the another end side of the common tube 38 is connected to the third expanding section 32C, and the first expanding section 32A, the second expanding section 32B, and the third expanding section 32C are all communicated, and these expanding sections are configured to each expand in a substantially circular cylindrical shape when supplied with air. Note that a surface on the seat rear side of the base section 32C1, of the air bag 32 is fixed by being adhered, via a double-sided tape or adhesive agent, to a surface on the seat front side of a seat pad 28A in the seat back 28.

Figure 4A:
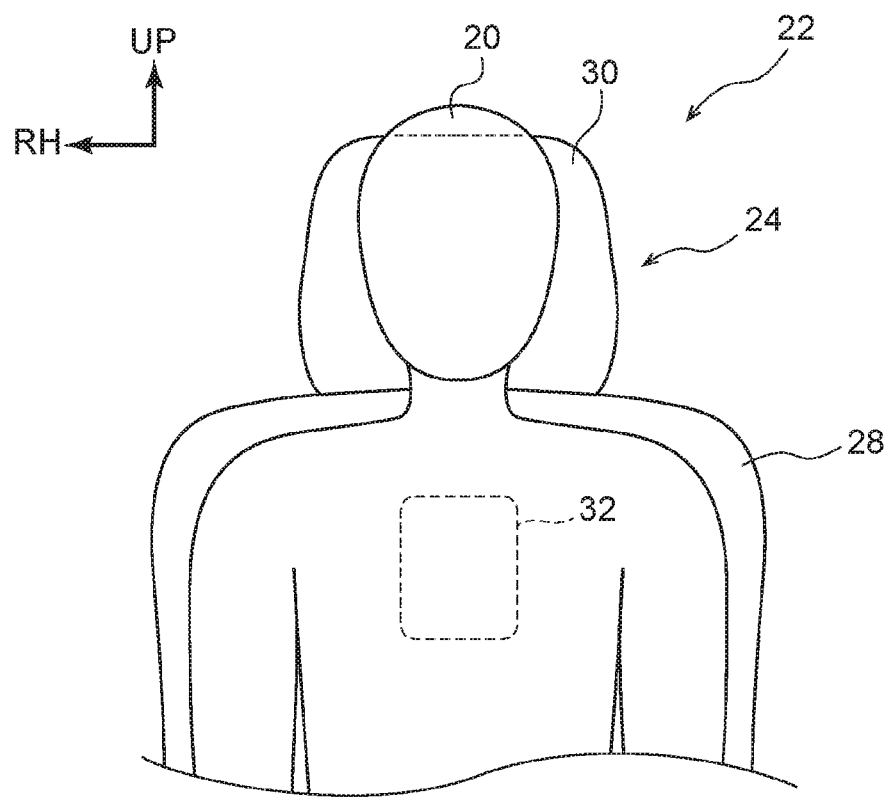
FIG. 4A shows a configuration of the air bag configuring a main section of the vehicular awakening system according to the first embodiment, and is a front view showing a state of the air bag attached to a seat back, seen from a seat front side.
Figure 5:
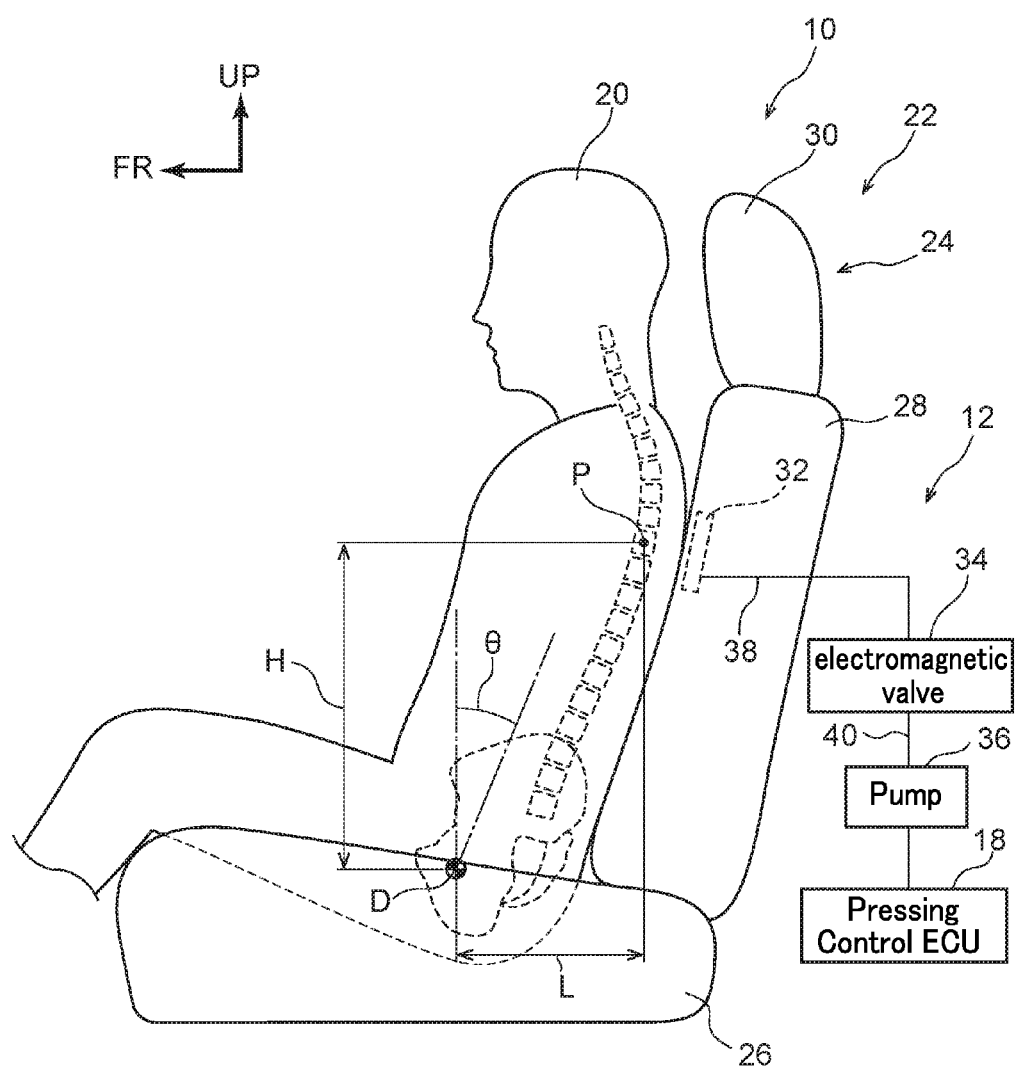
FIG. 5 is a side view showing a positional relationship of a seat, a driver, and the air bag, in the vehicular awakening system according to the first embodiment, seen from the seat width direction.

In addition, as shown in FIGS. 4A and 5, the air bag 32 is disposed in a position enabling pressing of a "standard position P" between shoulder blades of the driver 20. Now, the standard position P means a position and a periphery of the position, of a fifth thoracic vertebra of the driver 20 in a seated posture. More specifically, the standard position P is a place adopting as its reference a position whose distance L to the seat rear side is 250 [mm] from a greater trochanter D of the driver 20 and whose distance H to the seat upper side is 368 [mm] from the greater trochanter D. Note that the standard position P can also be regarded as a place adopting as its reference a position whose distance L to the seat rear side is 250 [mm] from a hip point (greater trochanter D) and whose distance H to the seat upper side is 368 [mm] from the hip point, in a dummy (JM50) sitting with a torso angle θ of 21[°].

Figure 3A:
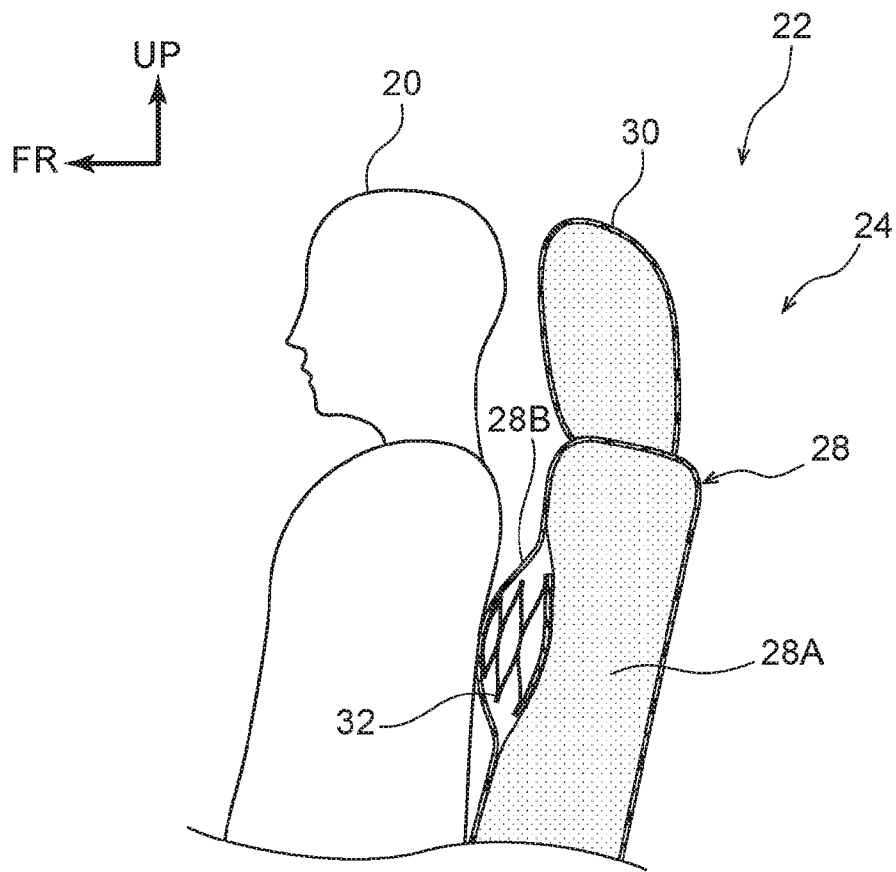
FIG. 3A shows a configuration of an air bag configuring a main section of the vehicular awakening system according to the first embodiment, and shows a cross-sectional view of the air bag when expanded seen from a seat width direction.
Figure 3B:
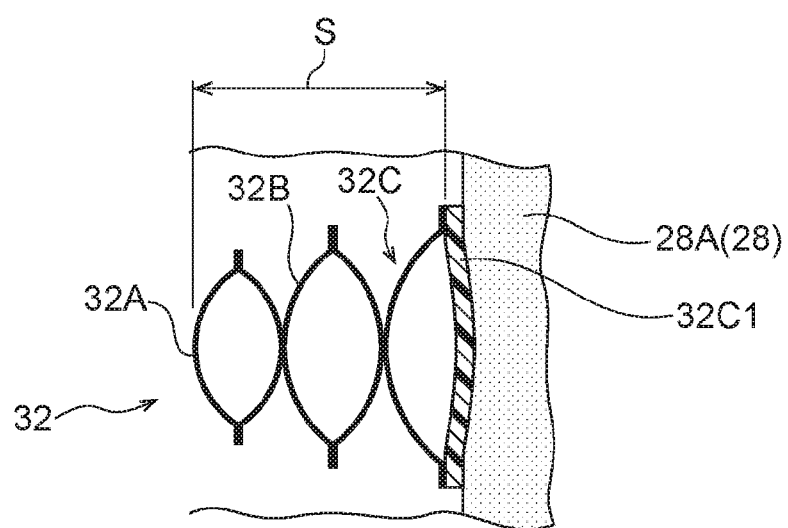
FIG. 3B shows a configuration of the air bag configuring a main section of the vehicular awakening system according to the first embodiment, and shows a cross-sectional view of the air bag when expanded seen from a seat up-down direction.
Figure 4B:
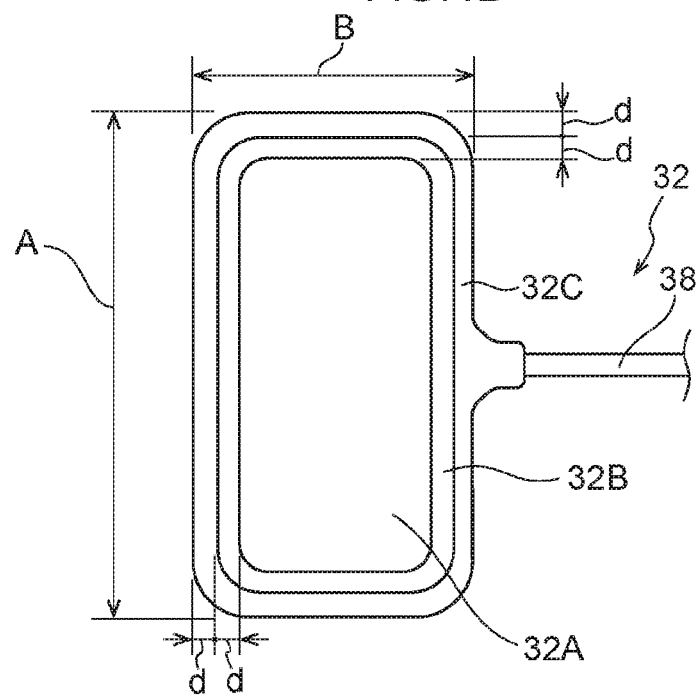
FIG. 4B shows a configuration of the air bag configuring a main section of the vehicular awakening system according to the first embodiment, and is a front view showing a state of the air bag when contracted, seen from the seat front side.

The air bag 32 configured as described above is disposed so as to cover the standard position P of the driver 20 when viewed from the front of the seat 22, and as shown in FIG. 3A, the standard position P is configured to be pressed by said air bag 32 being supplied with air. Note that the air bag 32 is configured to press the driver 20 via a cover 28B of the seat back 28 or an unillustrated slab provided on an inner side of said cover 28B. In addition, the air bag 32 may be configured by one expanding section. However, in the present embodiment, by the air bag 32 having a plurality of expanding sections overlaid in a seat front-rear direction, it is made possible for a stroke S in the seat front-rear direction of the air bag 32 to be secured, without dimensions in the seat width direction and the seat up-down direction of the air bag 32 being increased.

(Actions and Effects of Present Embodiment)

Next, actions and effects of the present embodiment will be described.

In the present embodiment, the automatic drive ECU 14 is included, and it is configured possible for the drive state of the vehicle to be switched between automatic drive and manual drive by said automatic drive ECU 14.

Incidentally, when the drive state of the vehicle is set to automatic drive, the driver 20 does not need to drive the vehicle, hence, conceivably, their judgment, and so on, with respect to a periphery of the vehicle deteriorates, and even if the drive state of the vehicle is switched to manual drive, it becomes difficult for the driver 20 to immediately return to driving of the vehicle.

Now, in the present invention, the pressing device 12 capable of pressing the standard position P between shoulder blades of the driver 20, and the pressing control ECU 18 that actuates said pressing device 12, are included. Moreover, when the drive state of the vehicle is automatic drive, the pressing device 12 is actuated by the pressing control ECU 18, whereby the standard position P of the driver 20 is pressed by said pressing device 12. It is decided to hereafter specifically describe an example of a control flow of the pressing device 12 by the pressing control ECU 18, using FIG. 1.

When this control flow is started, in step S100, it is determined by the pressing control ECU 18 whether the vehicle is in automatic drive or is in manual drive, based on a signal inputted from the automatic drive ECU 14. Then, in the case it has been determined that the vehicle is in automatic drive, the control flow proceeds to step S102, and in the case it has been determined that the vehicle is in manual drive, the control flow finishes and the pressing device 12 is set to non-actuation (is not actuated).

In step S102, it is determined by the pressing control ECU 18 whether the wakefulness level of the driver 20 is lower than the specified value or not, based on a signal inputted from the wakefulness detecting device 16. Then, in the case it has been determined that the wakefulness level of the driver 20 is lower than the specified value, the control flow proceeds to step S104, and in the case it has been determined that said wakefulness level is not lower than the specified value, the control flow proceeds to step S108.

In step S104, the pressing device 12 is actuated by the pressing control ECU 18 whereby expansion and contraction of the air bag 32 is repeated for a certain time, this causing the standard position P between shoulder blades of the driver 20 to be pressed. As a result, the driver 20 has a periphery of their fifth thoracic vertebra pressed whereby their back muscles are stretched, and by their fellow shoulder blades approaching, has their thoracic cage opened whereby deep breathing is encouraged. Then, after the pressing device 12 has been actuated for the certain time, the control flow proceeds to step S106.

In step S106, it is determined by the pressing control ECU 18 whether the wakefulness level of the driver 20 has improved to a value higher than the specified value or not, based on a signal inputted from the wakefulness detecting device 16. In other words, a step similar to step S102 is performed. Then, in the case it has been determined that the wakefulness level of the driver 20 has improved to a value higher than the specified value, the control flow proceeds to step S108, and in the case it has been determined that the wakefulness level of the driver 20 is lower than the specified value, the control flow returns to step S104.

In step S108, it is determined by the pressing control ECU 18 whether automatic drive of the vehicle has finished or not, based on a signal inputted from the automatic drive ECU 14. In other words, a step similar to step S100 is performed. Then, in the case it has been determined that automatic drive of the vehicle has finished, the control flow finishes and the pressing device 12 is set to non-actuation. On the other hand, in the case it has been determined that automatic drive of the vehicle has not finished, the control flow returns to step S102. That is, in the present embodiment, the control flow is set so as not to finish while the drive state of the vehicle is automatic drive.

By the pressing device 12 being controlled by the pressing control ECU 18 as described above, the wakefulness level of the driver 20 is increased, and maintenance of a state where driving of the vehicle by the driver 20 is possible or return to a state where driving of the vehicle by the driver 20 is possible, are enabled. Therefore, in the present embodiment, it is possible to secure a state that the driver 20 is able to return to manual drive when a switch from automatic drive to manual drive is made.

Moreover, in the present embodiment, the air bag 32 that expands by being supplied with air and is capable of pressing the standard position P of the driver 20, is arranged on the inside of the seat back 28 in the seat 22 in which the driver 20 sits. Moreover, by air being pressure-fed to this air bag 32 from the pump 36 based on control by the pressing control ECU 18, the air bag 32 expands and the standard position P of the driver 20 is pressed. As a result, in the present embodiment, an increase in the number of components arranged in the seat back 28 can be suppressed more compared to in a configuration where the standard position P of the driver 20 is pressed by a member such as a roller. Therefore, the present embodiment makes it possible to press the standard position P of the driver 20, without greatly changing a configuration of the seat back 28.

Furthermore, in the present embodiment, the air bag 32 is formed in a rectangular shape that covers the standard position P when viewed from a front of the seat 22 and extends in the seat up-down direction. As a result, the standard position P of the driver 20 can be pressed, even if there is variation in body build or seating position of the driver 20. Therefore, in the present embodiment, the wakefulness level of the driver 20 can be increased, even if there is variation in body build or seating position of the driver 20.

Additionally, in the present embodiment, the wakefulness detecting device 16 is provided, and the wakefulness level of the driver 20 is configured detectable. Moreover, the pressing device 12 is configured capable of pressing the standard position P when the drive state of the vehicle is automatic drive and the wakefulness level of the driver 20 detected by the wakefulness detecting device 16 is lower than the specified value. As a result, although the pressing device 12 does not actuate when the drive state of the vehicle is automatic drive and the wakefulness level of the driver 20 is higher than the specified value, the standard position P is pressed by the pressing device 12 when the drive state of the vehicle is automatic drive and the wakefulness level of the driver 20 is lower than the specified value. Therefore, in the present embodiment, the wakefulness level of a driver 20 of low wakefulness level can be efficiently increased.

<Second Embodiment>

Figure 6:
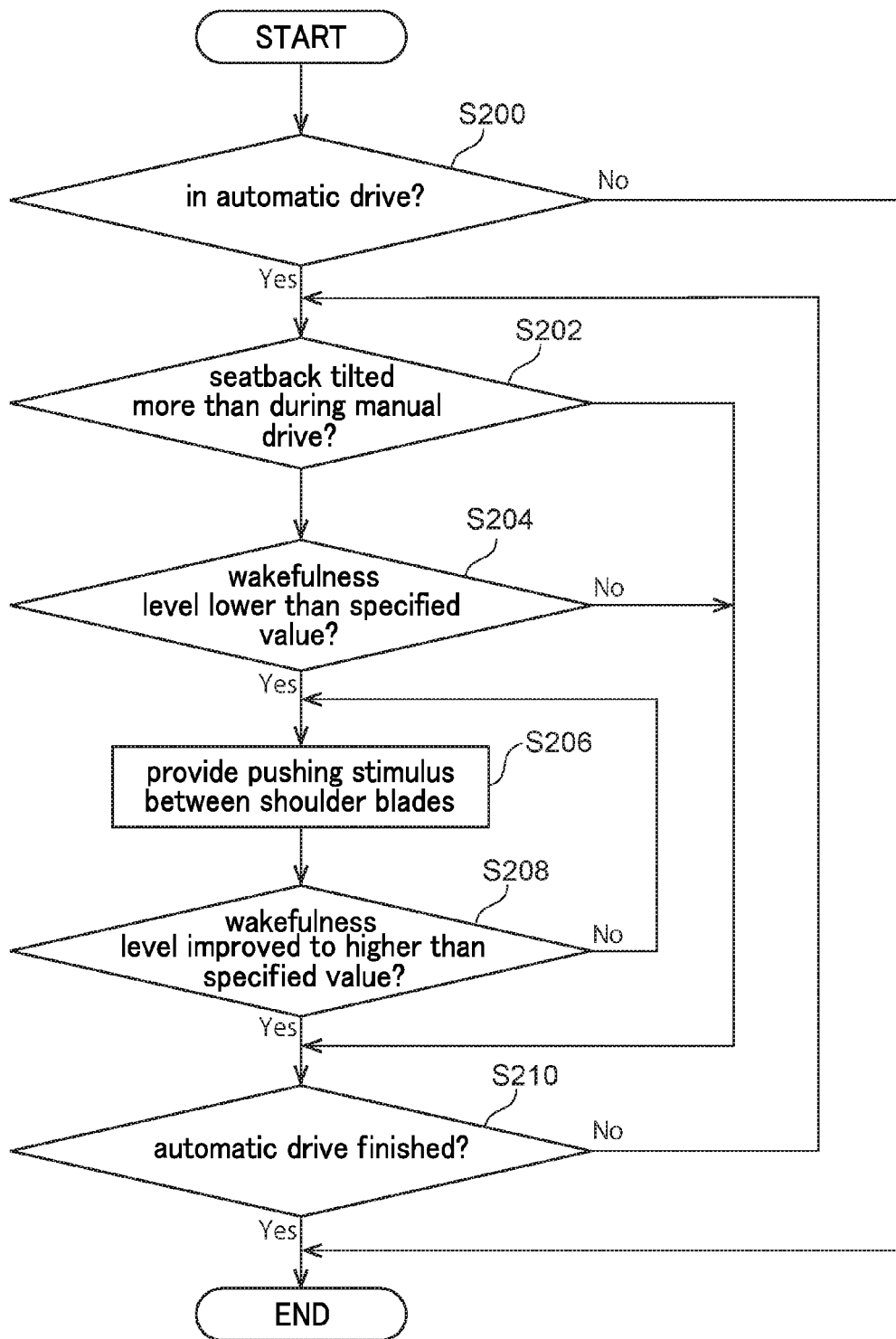
FIG. 6 is a flowchart showing a process performed by a vehicular awakening system according to a second embodiment.

A second embodiment of the vehicular awakening system according to the present invention will be described below using FIGS. 6 and 7. Note that configuring portions identical to those of the previously mentioned first embodiment will be assigned with identical numbers to those assigned in the first embodiment, and descriptions thereof will be omitted.

Figure 7:
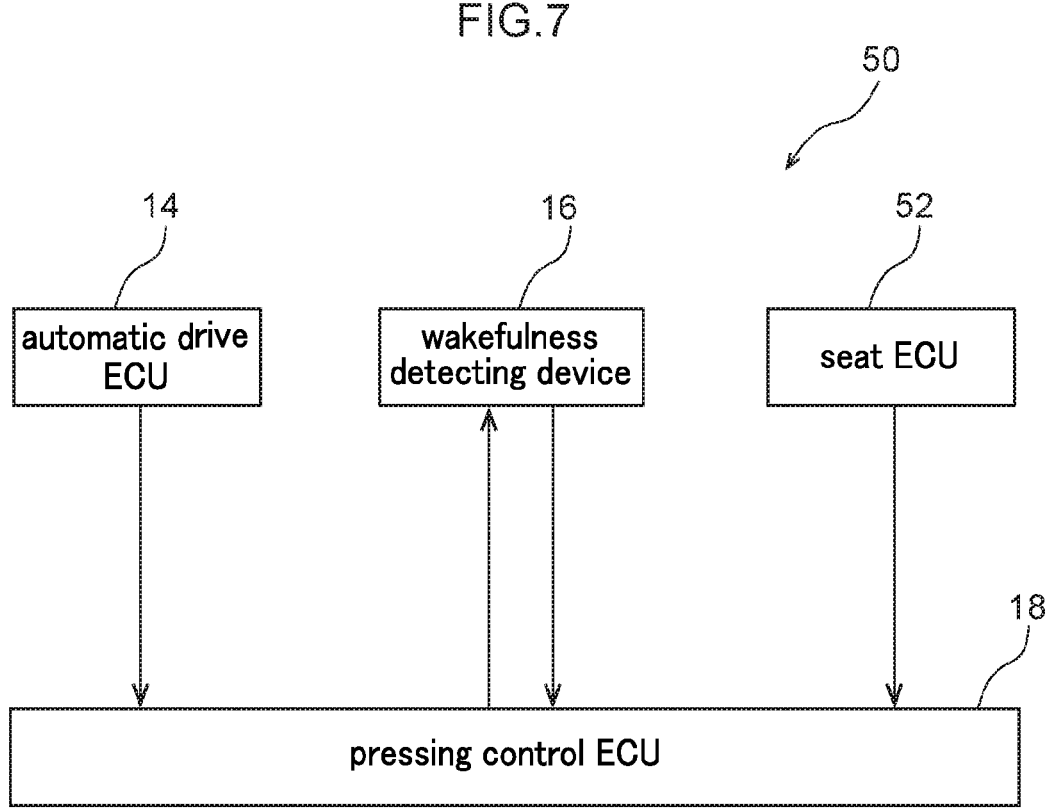
FIG. 7 is a block diagram showing a schematic configuration of the vehicular awakening system according to the second embodiment.

As shown in FIG. 7, a "vehicular awakening system 50" in the present embodiment, although basically configured similarly to the above-mentioned first embodiment, has a feature that the seat 22 is provided with: a "seat ECU 52" acting as an angle detecting section; and an unillustrated "reclining position sensor". The seat ECU 52 and the reclining position sensor are electrically connected, and the reclining position sensor is configured capable of outputting a signal corresponding to a tilting angle of the seat back 28 with respect to the seat cushion 26. In addition, the seat ECU 52 is electrically connected also to the pressing control ECU 18, and is configured capable of outputting to said pressing control ECU 18 the signal corresponding to the tilting angle of the seat back 28 inputted from the reclining position sensor. In other words, in the present embodiment, the tilting angle of the seat back 28 detected by the reclining position sensor and the seat ECU 52 is configured to be outputted to the pressing control ECU 18.

Now, in the present embodiment, a reference position of the seat back 28 stored in the pressing control ECU 18 and the tilting angle of the seat back 28 detected by the seat ECU 52 are configured to be compared by said pressing control ECU 18. Note that as an example, the tilting angle of the seat back 28 during manual drive is set as the reference position of the seat back 28. Moreover, the wakefulness level of the driver 20 is configured to be detected by the wakefulness detecting device 16 when it has been detected by the pressing control ECU 18 that the seat back 28 is tilted more to the seat rear side than the reference position. In other words, the seat ECU 52 and the reclining position sensor are employed in control of actuation of the pressing device 12, and in the present embodiment, the pressing control ECU 18, the wakefulness detecting device 16, the seat ECU 52, and the reclining position sensor function as the pressing control section.

(Actions and Effects of Present Embodiment)

Next, actions and effects of the present embodiment will be described. It is decided to first describe a control flow of the pressing device 12 according to the present embodiment, using FIG. 6.

When this control flow is started, in step S200, a process similar to that of step S100 in the above-mentioned first embodiment is performed. Then, in the case it has been determined that the vehicle is in automatic drive, the control flow proceeds to step S202, and in the case it has been determined that the vehicle is in manual drive, the control flow finishes and the pressing device 12 is set to non-actuation.

In step S202, it is determined by the pressing control ECU 18 whether the seat back 28 is tilted more to the seat rear side than during manual drive or not, based on a signal inputted from the seat ECU 52. Then, in the case it has been determined that the seat back 28 is tilted more to the seat rear side than during manual drive, the control flow proceeds to step S204, and in the case it has been determined that the seat back 28 is not tilted more to the seat rear side than during manual drive, the control flow proceeds to step S210.

In step S204, a process similar to that of step S102 in the above-mentioned first embodiment is performed. Then, in the case it has been determined that the wakefulness level of the driver 20 is lower than the specified value, the control flow proceeds to step S206, and in the case it has been determined that said wakefulness level is not lower than the specified value, the control flow proceeds to step S210.

In step S206, a process similar to that of step S104 in the above-mentioned first embodiment is performed. Then, after the pressing device 12 has been actuated for the certain time, the control flow proceeds to step S208.

In step S208, a process similar to that of step S106 in the above-mentioned first embodiment is performed. Then, in the case it has been determined that the wakefulness level of the driver 20 has improved to a value higher than the specified value, the control flow proceeds to step S210, and in the case it has been determined that the wakefulness level of the driver 20 is lower than the specified value, the control flow returns to step S206.

In step S210, a process similar to that of step S108 in the above-mentioned first embodiment is performed. Then, in the case it has been determined that automatic drive of the vehicle has finished, the control flow finishes and the pressing device 12 is set to non-actuation. On the other hand, in the case it has been determined that automatic drive of the vehicle has not finished, the control flow returns to step S202.

By the pressing device 12 being controlled by the pressing control ECU 18 as described above, basically, actions and effects similar to those of the above-mentioned first embodiment can be displayed also in the present embodiment.

Moreover, in the present embodiment, the seat ECU 52 and the reclining position sensor are provided, and the tilting angle of the seat back 28 in the seat 22 in which the driver 20 sits is configured detectable.

Incidentally, when the tilting angle of the seat back 28 is comparatively small, for example, when the seat back 28 is in the reference position during manual drive, and so on, it is difficult for own weight of the driver 20 to be applied to the seat back 28. Therefore, conceivably, a proportion of pressing force due to the air bag 32 (the pressing device 12) employed in pressing of the standard position P is reduced.

Now, in the present embodiment, the wakefulness level of the driver 20 is configured capable of being detected by the wakefulness detecting device 16 when it has been detected by the seat ECU 52 and the reclining position sensor that the seat back 28 is tilted to the seat rear side from the reference position. In other words, in the present embodiment, when the seat back 28 is tilted to the seat rear side from the reference position, the wakefulness level of the driver 20 is detected by the wakefulness detecting device 16. Moreover, the standard position P is pressed by the pressing device 12 when the drive state of the vehicle is automatic drive and the wakefulness level of the driver 20 detected by the wakefulness detecting device 16 is lower than the specified value.

As a result, in the present embodiment, it is configured such that when the seat back 28 is in the reference position, the pressing device 12 does not activate. On the other hand, when the seat back 28 is tilted to the seat rear side from the reference position, the standard position P is pressed by the pressing device 12 when the drive state of the vehicle is automatic drive and the wakefulness level of the driver 20 is lower than the specified value. Therefore, in the present embodiment, when it is easy for own weight of the driver 20 to be applied to the seat back 28, the pressing device 12 can be actuated and the proportion of pressing force due to the air bag 32 employed in pressing of the standard position P can be increased.

<Third Embodiment>

Figure 8:
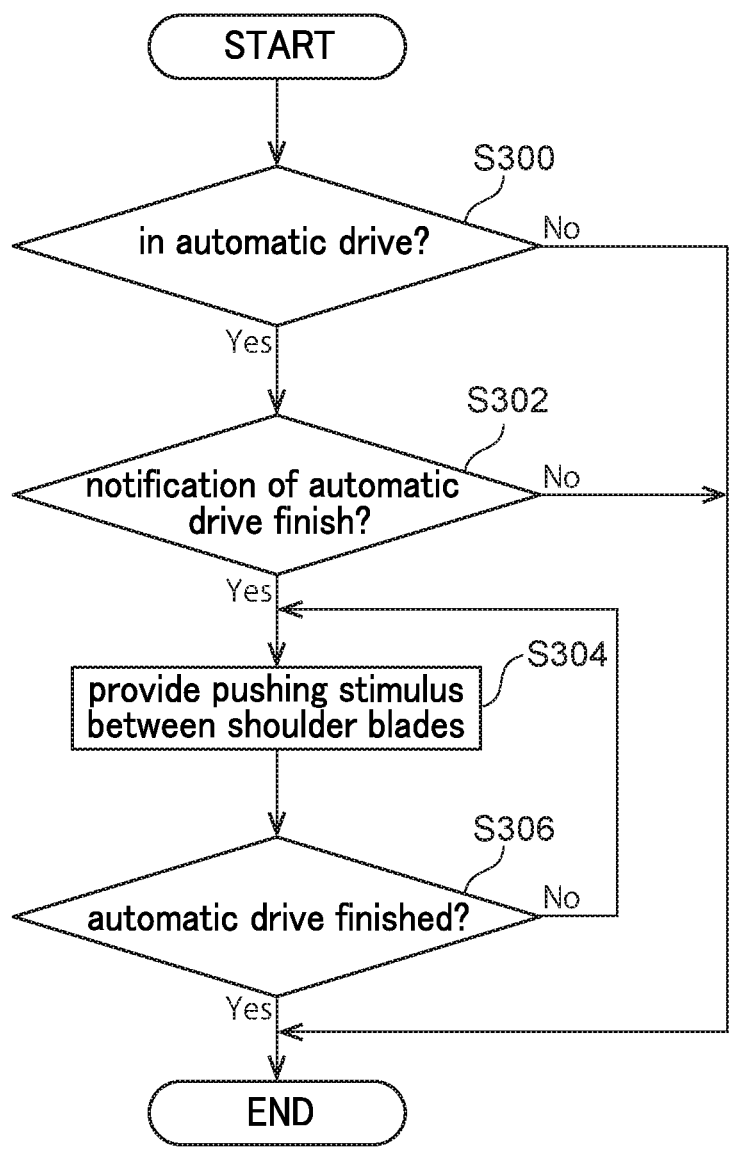
FIG. 8 is a flowchart showing a process performed by a vehicular awakening system according to a third embodiment.

A third embodiment of the vehicular awakening system according to the present invention will be described below using FIGS. 8 and 9. Note that configuring portions identical to those of the previously mentioned first embodiment will be assigned with identical numbers to those assigned in the first embodiment, and descriptions thereof will be omitted.

Figure 9:
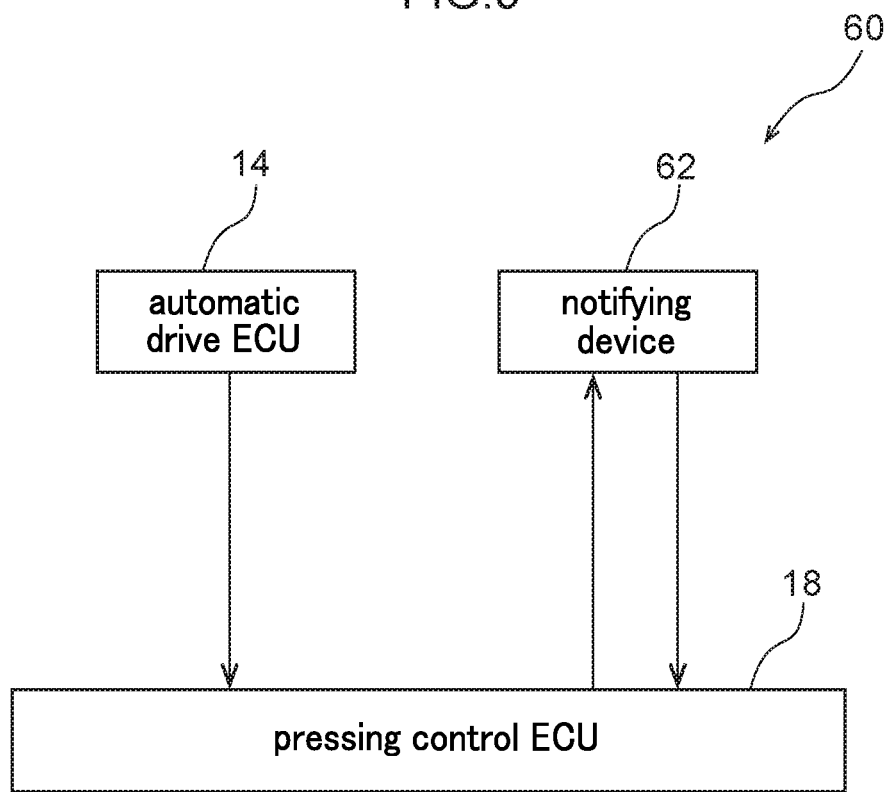
FIG. 9 is a block diagram showing a schematic configuration of the vehicular awakening system according to the third embodiment.

As shown in FIG. 9, a "vehicular awakening system 60" in the present embodiment, although basically configured similarly to the above-mentioned first embodiment, has a feature that a "notifying device 62" acting as a notifying section is provided instead of the wakefulness detecting device 16.

The notifying device 62 is configured including: an unillustrated peripheral circumstances detecting section configured including a plurality of sensors and thereby capable of recognizing peripheral circumstances of the vehicle; and an unillustrated alarm, and the peripheral circumstances detecting section and the alarm are electrically connected to the pressing control ECU 18.

Now, in the present embodiment, it is configured such that when the vehicle is in automatic drive, the pressing control ECU 18 can determine whether continuation of automatic drive of the vehicle is difficult or not, or whether there is a need to request a return to manual drive of the driver 20 or not, based on information obtained from the peripheral circumstances detecting section. Moreover, it is configured such that in the case it has been determined by the pressing control ECU 18 that continuation of automatic drive is difficult or it has been determined by the pressing control ECU 18 that there is a need to request a return to manual drive of the driver 20, the driver 20 is notified by the alarm and the drive state of the vehicle is switched to manual drive by the automatic drive ECU 14.

Moreover, the pressing control ECU 18 is set so as to actuate the pressing device 12 when the pressing control ECU 18 has determined that the driver 20 has been notified by the notifying device 62 of finish of automatic drive. Specifically, the pressing control ECU 18 is configured to actuate the pressing device 12 in a period from notification by the notifying device 62 to the drive state of the vehicle being switched to manual drive. In other words, the notifying device 62 is employed also in control of actuation of the pressing device 12, and in the present embodiment, the pressing control ECU 18 and the notifying device 62 function as the pressing control section.

(Actions and Effects of Present Embodiment)

Next, actions and effects of the present embodiment will be described. It is decided to first describe a control flow of the pressing device 12 according to the present embodiment, using FIG. 8.

When this control flow is started, in step S300, a process similar to that of step S100 in the above-mentioned first embodiment is performed. Then, in the case it has been determined that the vehicle is in automatic drive, the control flow proceeds to step S302, and in the case it has been determined that the vehicle is in manual drive, the control flow finishes and the pressing device 12 is set to non-actuation.

In step S302, it is determined by the pressing control ECU 18 whether the driver 20 has been notified by the notifying device 62 of finish of automatic drive or not. Then, in the case it has been determined that notification has been performed, the control flow proceeds to step S304, and in the case it has been determined that notification has not been performed, the control flow finishes and the pressing device 12 is set to non-actuation.

In step S304, a process similar to that of step S104 in the above-mentioned first embodiment is performed. Then, after the pressing device 12 has been actuated for the certain time, the control flow proceeds to step S306.

In step S306, a process similar to that of step S108 in the above-mentioned first embodiment is performed. Then, in the case it has been determined that automatic drive of the vehicle has finished, the control flow finishes and the pressing device 12 is set to non-actuation. On the other hand, in the case it has been determined that automatic drive of the vehicle has not finished, the control flow returns to step S304.

By the pressing device 12 being controlled by the pressing control ECU 18 as described above, basically, actions and effects similar to those of the above-mentioned first embodiment can be displayed also in the present embodiment.

Moreover, in the present embodiment, the notifying device 62 is provided, and the driver 20 is notified, by the notifying device 62, of the fact that the drive state of the vehicle will be switched from automatic drive to manual drive by the automatic drive ECU 14. Moreover, the standard position P is pressed by the pressing device 12 in a period from notification of the driver 20 by the notifying device 62 to the drive state of the vehicle being switched from automatic drive to manual drive. As a result, at such times as when continuation of automatic drive of the vehicle is difficult, the driver 20 is notified of switching from automatic drive to manual drive, and regardless of the wakefulness level of the driver 20, back muscles of the driver 20 are stretched by the pressing device 12, whereby the wakefulness level of the driver 20 is increased. Therefore, in the present embodiment, return to manual drive of the driver 20 can be smoothly made after notification of switching from automatic drive to manual drive.

<Supplementary Description of Above-Described Embodiments>

(1) In the above-mentioned embodiments, the wakefulness detecting device 16, the seat ECU 52, the reclining position sensor, and the notifying device 62 functioned as part of the pressing control section. However, it is possible to adopt a configuration in which only the pressing control ECU 18 is caused to function as the pressing control section. Specifically, there may be adopted a configuration in which when the drive state of the vehicle is automatic drive, the pressing device 12 is continuously or intermittently actuated by the pressing control ECU 18. Such a configuration makes it possible for the wakefulness level of the driver 20 to always be maintained in a high state.

(2) Moreover, in the above-mentioned embodiments, the air bag 32 was disposed on the inside of the seat back 28. However, it is possible to adopt a configuration in which the air bag 32 is provided in a lumbar support configured by a separate body to the seat back 28 and configured fixable to said seat back 28. Such a configuration makes it possible to dispose the air bag 32 without changing a configuration of the seat back 28. Moreover, there may be adopted a configuration in which the likes of a roller is disposed instead of the air bag 32, thereby providing a change in a way of applying a pressing force pressing the driver 20.

(3) In the above-mentioned first embodiment, the wakefulness detecting device 16 functioned as the pressing control section; in the above-mentioned second embodiment, the wakefulness detecting device 16 and the seat ECU 52 functioned as the pressing control section; and in the above-mentioned third embodiment, the notifying device 62 functioned as the pressing control section. However, the present invention is not limited to this. As an example, there may be adopted a configuration that provides the vehicle with the wakefulness detecting device 16, the seat ECU 52, and the notifying device 62, and provides a switching section capable of switching to a control mode corresponding to each of the above-mentioned embodiments. Such a configuration makes it possible to appropriately handle peripheral circumstances of the vehicle or the state of the driver 20, thereby securing a state that the driver 20 is able to return to manual drive.

(4) In the above-mentioned first embodiment and second embodiment, the wakefulness detecting device 16 detecting the wakefulness level by the degree-of-opening of the eye of the driver 20, was employed. However, the present invention is not limited to this. As an example, there may be adopted a configuration in which an electrocardiogram measuring device, or the like, is disposed in the seat back 28 and the wakefulness level is detected based on the likes of heart rate of the driver 20.

What is claimed is:

1. A vehicular awakening system, comprising:
a drive control section capable of switching a drive state of a vehicle between automatic drive and manual drive;
a pressing section capable of protruding from a seat back such that, when shoulder blades of a driver are in contact with the seat back, the pressing section presses a standard position between the shoulder blades of the driver; and
a pressing control section that activates the pressing section when the drive state of the vehicle is automatic drive or when the drive state of the vehicle is switched from automatic drive to manual drive by the drive control section.

2. The vehicular awakening system according to claim 1, wherein the pressing section is configured to include:
an air bag that is arranged on an inside of the seat back in a seat in which the driver sits, and that is capable of expanding by being supplied with air to press the standard position; and
an air supply section capable of pressure-feeding air to the air bag based on control by the pressing control section.

3. The vehicular awakening system according to claim 2, wherein
the air bag is formed in a rectangular shape that covers the standard position when viewed from a front of the seat and extends in a seat up-down direction.

4. The vehicular awakening system according to claim 1, wherein
the pressing control section comprises a driver state detecting section capable of detecting a wakefulness level of the driver, and
the pressing section is configured so as to be capable of pressing the standard position when the drive state of the vehicle is automatic drive and the wakefulness level of the driver detected by the driver state detecting section is lower than a certain value.

5. The vehicular awakening system according to claim 4, wherein
the pressing control section further comprises an angle detecting section capable of detecting a tilting angle of the seat back in the seat in which the driver sits, and
the driver state detecting section is configured so as to be capable of detecting the wakefulness level of the driver when the angle detecting section has detected that the seat back is tilted to a seat rear side from a reference position.

6. The vehicular awakening system according to claim 4, wherein the driver state detecting section detects the wakefulness level by a degree-of-opening of eyes of the driver, or detects the wakefulness level based on a heart rate of the driver.

7. The vehicular awakening system according to claim 1, wherein
the pressing control section comprises a notifying section capable of notifying the driver that the drive state of the vehicle is being switched from automatic drive to manual drive by the drive control section, and
the pressing section is configured so as to be capable of pressing the standard position during a period from notification of the driver by the notifying section until the drive state of the vehicle is switched from automatic drive to manual drive.

8. The vehicular awakening system according to claim 1, wherein the pressing section is also capable of retracting toward the seat back.

* * * * *